(No Model.)
F. N. BROOKER.
MUCILAGE BOTTLE.
No. 574,385.  Patented Jan. 5, 1897.
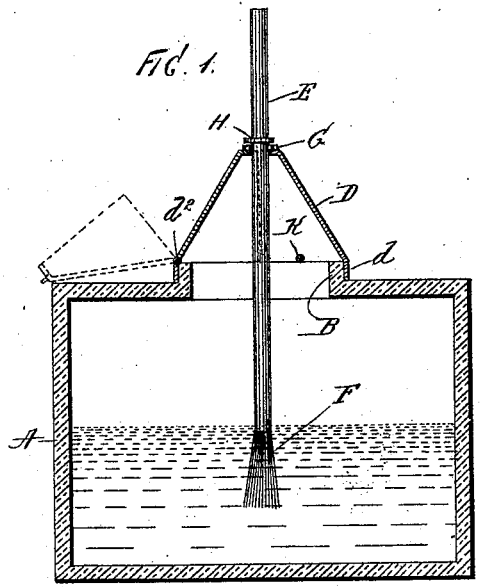
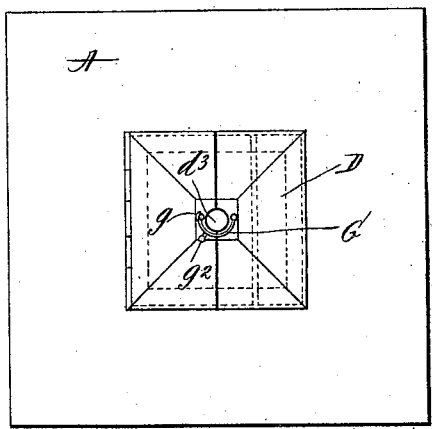
WITNESSES:
John Buckler,
C. Gerst
INVENTOR
Frank N. Brooker,
BY Edgar Tate & Co
ATTORNEYS.

United States Patent Office.

FRANK NOBLE BROOKER, OF EAST HAVEN, CONNECTICUT, ASSIGNOR OF ONE-HALF TO FRANK R. PERRY, OF NEW HAVEN, CONNECTICUT.

MUCILAGE-BOTTLE.

SPECIFICATION forming part of Letters Patent No. 574,385, dated January 5, 1897.

Application filed February 27, 1896. Serial No. 581,095. (No model.)

*To all whom it may concern:*

Be it known that I, FRANK NOBLE BROOKER, a citizen of the United States, and a resident of East Haven, in the county of New Haven and State of Connecticut, have invented certain new and useful Improvements in Mucilage-Bottles, of which the following is a specification, reference being had to the accompanying drawings, forming a part thereof, in which similar letters of reference indicate corresponding parts.

This invention relates to mucilage-bottles; and the object thereof is to provide an improved device of this class which is provided with the usual neck, to which is secured a hollow, conical, or pyramidal attachment, the apex of which is directed upwardly, said attachment being composed of two parts, one of which is hinged in position, and being provided with an aperture at its apex, which is adapted to receive the handle of a brush; and with this and other objects in view the invention consists in the construction, combination, and arrangement of parts hereinafter described and claimed.

The invention is fully disclosed in the following specification, of which the accompanying drawings form a part, in which—

Figure 1 is a central vertical section of my improved mucilage-bottle, and Fig. 2 a plan view thereof.

In the practice of my invention I provide a mucilage-bottle A, which may be of any desired form, and which is preferably composed of glass and provided with a neck B, and secured to the neck B is a hollow, conical, or pyramidal attachment D, the base of which is provided with a depending flange or rim $d$, which surrounds said neck, and said attachment is composed of two equal parts, one of which is hinged to said rim or flange, as shown at $d^2$, and through the top of said attachment, or at the top thereof, is formed a circular opening $d^3$, which is adapted to receive the handle E of a brush F.

Pivoted at one side of the circular opening $d^3$ is a spring-catch G, the free end of which is adapted to operate in connection with a lug or projection $g$, so as to hold the hinged section of the attachment in position, and said spring-catch is provided with a handle or projection $g^2$, by which it is operated.

The handle E of the brush F is provided with a disk H, which is adjustable thereon, and which is adapted to support the brush in any desired position, or so as to correspond with the amount of mucilage within the bottle, and arranged transversely of the neck B of the bottle is a wire rod K, on which the brush may be wiped, so as to remove the surplus mucilage therefrom, and the object of this arrangement is to prevent the mucilage from coming in contact with and clogging the neck of the bottle.

Whenever it is desired to remove the brush, the hinged section of the attachment D is swung down, as shown in dotted lines in Fig. 1, and the operation will be readily understood from the foregoing description when taken in connection with the accompanying drawings.

This device is simple in construction and operation and perfectly adapted to accomplish the result for which it is intended, and is comparatively inexpensive.

Having fully described my invention, I claim as new and desire to secure by Letters Patent—

1. The herein-described mucilage-bottle which is provided with a neck, to which is secured an attachment, the walls of which are contracted inwardly and upwardly, said attachment consisting of two parts, one of which is hinged in position, and the separate parts being provided at the top with an opening, adapted to receive the handle of a brush, and one of said parts being provided with a hinged clasp, by which the hinged section is held in place, substantially as shown and described.

2. The herein-described mucilage-bottle, which is provided with a neck, to which is secured an attachment, the walls of which are contracted inwardly and upwardly, said attachment consisting of two parts, one of which is hinged in position, and the separate parts being provided at the top with an opening, adapted to receive the handle of a brush, and one of said parts being provided with a hinged clasp, by which the hinged section is held in place, and the neck of the bottle being also provided with a cross-rod or wire on which the brush may be wiped, substantially as shown and described.

In testimony that I claim the foregoing as my invention I have signed my name, in presence of the subscribing witnesses, this 21st day of February, 1896.

FRANK NOBLE BROOKER.

Witnesses:
   JENNIE L. BROOKER,
   BENNETT TODD.